(12) United States Patent
Giesen et al.

(10) Patent No.: US 8,165,182 B2
(45) Date of Patent: Apr. 24, 2012

(54) SOLID-STATE LASER

(75) Inventors: Adolf Giesen, Aichtal (DE); Gerhard Spindler, Waldshut-Tiengen (DE); Thomas Hall, Wildberg (DE); Jochen Speiser, Stuttgart (DE); Jens Mende, Leinfelden-Echterdingen (DE)

(73) Assignee: Deutsches Zentrum fuer Luft-und Raumfahrt e.V., Cologne (DE)

( * ) Notice: Subject to any disclaimer, the term of this patent is extended or adjusted under 35 U.S.C. 154(b) by 0 days.

(21) Appl. No.: 12/804,574

(22) Filed: Jul. 23, 2010

(65) Prior Publication Data

US 2011/0044361 A1    Feb. 24, 2011

Related U.S. Application Data

(63) Continuation of application No. PCT/EP2009/050448, filed on Jan. 15, 2009.

(30) Foreign Application Priority Data

Jan. 28, 2008  (DE) .......................... 10 2008 008 078

(51) Int. Cl.
  *H01S 3/13*   (2006.01)
  *H01S 3/07*   (2006.01)
  *H01S 3/08*   (2006.01)

(52) U.S. Cl. ...................... 372/101; 372/29.022; 372/67

(58) Field of Classification Search ................ 372/15, 372/29.022, 67, 99, 101
See application file for complete search history.

(56) References Cited

U.S. PATENT DOCUMENTS

| 5,386,427 | A  | * | 1/1995  | Zayhowski | ............ 372/34 |
| 7,415,057 | B2 |   | 8/2008  | Hall |   |
| 7,773,658 | B2 |   | 8/2010  | Hall |   |
| 2002/0172253 | A1 | * | 11/2002 | Vetrovec | ............ 372/95 |
| 2005/0195881 | A1 |   | 9/2005  | Hall |   |
| 2008/0298423 | A1 |   | 12/2008 | Hall |   |

FOREIGN PATENT DOCUMENTS

EP    0 632 551    1/1995

(Continued)

OTHER PUBLICATIONS

Voss, A, et al., "Intra-Cavity Beam Shaping for High Power Thin-Disk Lasers", Proceedings of SPIE—The International Society for Optical Engineering—XVI International Symposium of Gas Flow Chemical Lasers, and High-Power Lasers, vol. 6346, 2007, 12 pages.

(Continued)

*Primary Examiner* — Armando Rodriguez
(74) *Attorney, Agent, or Firm* — Lipsitz & McAllister, LLC

(57) ABSTRACT

In order to improve a solid-state laser, in particular a solid-state disc laser, comprising a resonator (40) that defines a resonator radiation field (30) and at least one solid-state disc (12) with the resonator radiation field (30) passing through it, in such a manner that the thermal lens effect can be at least substantially compensated, it is proposed that in reflection the resonator radiation field (30) strikes at least one first adaptive mirror unit (50, 70), with which a distortion of the resonator radiation field (30) as a result of a thermal lens effect of the at least one solid-state disc (12) can be substantially compensated. An adaptive mirror unit (50) can be configured by a heated (58a, 58b) glass sheet (54) with an HR layer (52), for example, or by a pressure-induced deformation by means a fluid (78) in a space (76), which is enclosed with the mirror (72, 74).

17 Claims, 6 Drawing Sheets

FOREIGN PATENT DOCUMENTS

| | | |
|---|---|---|
| EP | 0 869 591 | 10/1998 |
| EP | 0 869 592 | 10/1998 |
| EP | 1 453 157 | 9/2004 |
| EP | 1 566 866 | 8/2005 |
| FR | 2 786 938 | 6/2000 |
| FR | 2786938 * | 9/2000 |

OTHER PUBLICATIONS

Pavel, N, et al., "Positive-Branch Unstable Resonators With Thermal Lens Compensation", Optics and Laser Technology, Elsevier Science Ltd, vol. 28 No. 6, 1996, pp. 451-455.

* cited by examiner

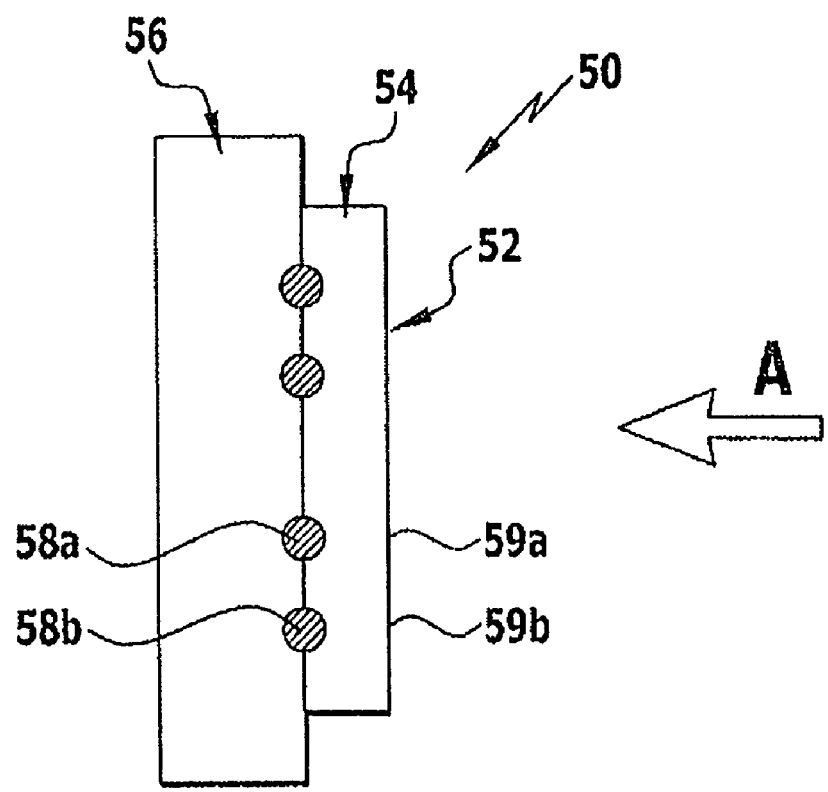
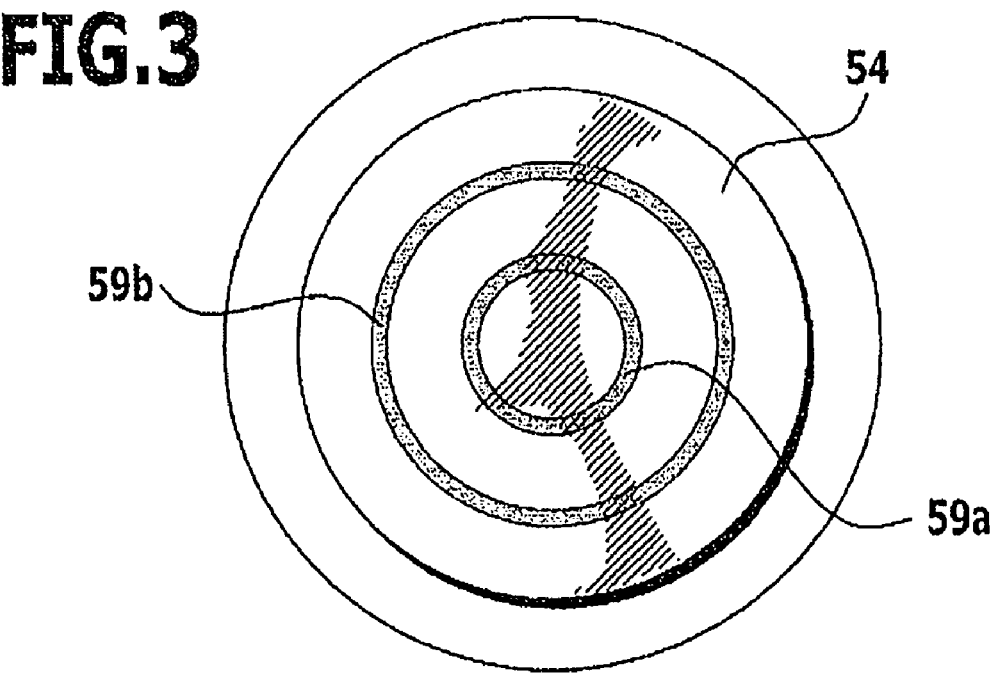

SOLID-STATE LASER

This application is a continuation of international application number PCT/EP2009/050448 filed on Jan. 15, 2009 and claims the benefit of German Patent Application No. 10 2008 008 078.0 filed on Jan. 28, 2008.

The present disclosure relates to the subject matter disclosed in international application number PCT/EP2009/050448 of Jan. 15, 2009 and German application number 10 2008 008 078.0 of Jan. 28, 2008, which are incorporated herein by reference in their entirety and for all purposes.

BACKGROUND OF THE INVENTION

The invention relates to a solid-state laser, in particular a solid-state disc laser, comprising a resonator that defines a resonator radiation field and at least one solid-state disc with the resonator radiation field passing through it.

Such solid-state lasers are known from the prior art, for example, European patent applications 0 632 551 A, 0 869 591 A, 0 869 592 A, 1 453 157 A.

There is the problem with these that while at low optical power levels the thermal lens effect of the solid-state disc is not of great consequence, the thermal lens effect poses problems at high power levels.

Therefore, the object forming the basis of the invention is to improve a solid-state laser of the above-mentioned type in such a manner that the thermal lens effect can be at least substantially compensated.

SUMMARY OF THE INVENTION

This object is achieved according to the invention with a solid-state laser of the above-described type in that in reflection the resonator radiation field strikes at least one first adaptive mirror unit, with which a distortion of the resonator radiation field as a result of a thermal lens effect of the at least one solid-state disc can be substantially compensated.

The advantage of the solution according to the invention lies in that it is thus possible to substantially compensate the distortion of the resonator radiation field as a result of the thermal lens effect or compensate it to some degree, and to thus avert the negative effects on the resonator radiation field and the beam quality.

It is particularly favourable in this case if the distortions of the resonator radiation field as a result of the thermal lens effect of a maximum of two solid-state discs can be substantially compensated with the first adaptive mirror unit.

It is thus possible to keep the number of the first adaptive mirror units as low as possible.

A wide variety of solutions are conceivable with respect to the configuration of the first adaptive mirror unit.

A particularly advantageous solution provides that the first adaptive mirror unit is a thermally adaptive mirror unit, the reflection behaviour of which is thermally adjustable.

Such a thermal adjustability of the reflection behaviour is possible in this case in a wide variety of ways.

One possibility provides achieving the thermal adjustability as a result of thermal expansions in the mirror unit by means of heating coils that can be heated electrically, for example.

Another possibility lies in adjusting the thermally adaptive mirror unit in such a manner that the different local thermal heating occurs as a result of an incident radiation field, e.g. infrared radiation.

Such an incident radiation field can be provided with any desired patterns in accordance with known possibilities for radiation field shaping, wherein a pattern effects a varying intensity progression of the radiation field, so that any desired shapes of heated regions can be achieved that lead to corresponding desired shapes of thermally expanded regions of material and therefore forwardly curved regions of the reflector surface.

It is particularly favourable in this case if non-spherical distortions of the resonator radiation field can be corrected with the first adaptive mirror unit.

A further advantageous solution provides that in the resonator radiation field a second adaptive mirror unit is provided, with which distortions of the resonator radiation field occurring as a result of the thermal lens effect of the at least one solid-state disc can be compensated.

It is particularly favourable in this case if the distortions as a result of thermal lens effect of a maximum of two solid-state discs can be compensated with the second adaptive mirror unit.

In particular, it is expedient in this case if spherical distortions of the laser radiation field can be compensated with the second adaptive mirror unit.

In principle, the second adaptive mirror unit could likewise be configured as a thermally adaptive mirror unit.

However, spherical distortions can be compensated in a particularly simple manner if the second adaptive mirror unit is configured as a hydrostatically adaptive mirror.

In such a hydrostatically configured mirror the curvature of a plate is variably adjustable, wherein the curvature is adjusted by means of a hydrostatic pressure of a fluid arranged on one side of the plate.

No precise details have been given so far with respect to the arrangement of the solid-state disc.

Thus, an advantageous solution provides that the solid-state disc is arranged on a reflector and in reflection has the resonator radiation field passing through it.

It is particularly favourable in this case if the at least one solid-state disc is arranged with the reflector on a cooling body.

To enable a particular compensation to occur, the at least one solid-state disc is combined with at least one adaptive mirror unit to form an amplification module, which can be positioned in the resonator as a unit.

Such an amplification module can thus be optimally adjusted with respect to the compensation and then adjusted in relation to the resonator.

A particularly favourable solution provides that the at least one solid-state disc is combined with a first adaptive mirror unit for the correction of non-spherical distortions and with a second adaptive mirror unit for the correction of spherical distortions to form an amplification module, wherein in each amplification module, there are compensated the distortions of the resonator radiation field by the at least one solid-state disc provided in the amplification module.

It is particularly expedient if two solid-state discs are combined with a first adaptive mirror unit and a second adaptive mirror unit to form an amplification unit.

A laser according to the invention can be assembled in a particularly advantageous manner, preferably for high power levels, if the resonator radiation field passes through a plurality of such amplification modules.

No precise details have been given so far with respect to the configuration of the resonator.

Thus, it would be conceivable, for example, to provide a stable resonator.

However, a stable resonator has disadvantages with respect to the size of the structure and with respect to decoupling at high power levels, since decoupling over a partially reflective reflector is problematic because of the heating thereof.

For this reason an advantageous solution provides that the resonator is configured as an unstable resonator, since an unstable resonator provides the possibility of decoupling a radially outwardly located sub-region of the resonator radiation field by means of complete reflectors or complete transmission.

It is particularly favourable in this case if the resonator is a confocal unstable resonator, since this has particularly advantageous optical properties and a particularly advantageous coupling of the modes.

Moreover, it is advantageous, particularly in association with the solid-state disc, if the resonator is configured rotationally symmetrically to an optical axis of the resonator radiation field.

In this case, decoupling preferably occurs on the basis that a region of the resonator radiation field located radially outwardly in relation to the optical axis can be decoupled from the unstable resonator.

In this case, the radially outwardly located region preferably has the shape of an annular segment relative to the optical axis.

In this case, the annular segment could merely cover a small angle range.

An advantageous solution provides that the ring segment extends over approximately 180°.

It is particularly favourable in this case if the decoupled radiation field is decoupled by means of a reflective output mirror.

Further features and advantages of the invention are the subject of the following description and also the drawing representing some exemplary embodiments.

BRIEF DESCRIPTION OF THE DRAWINGS

FIG. 2 is a schematic sectional view through a first adaptive mirror unit;

FIG. 3 is a plan view in the direction of arrow A in FIG. 2;

DETAILED DESCRIPTION OF THE INVENTION

Figure 1:
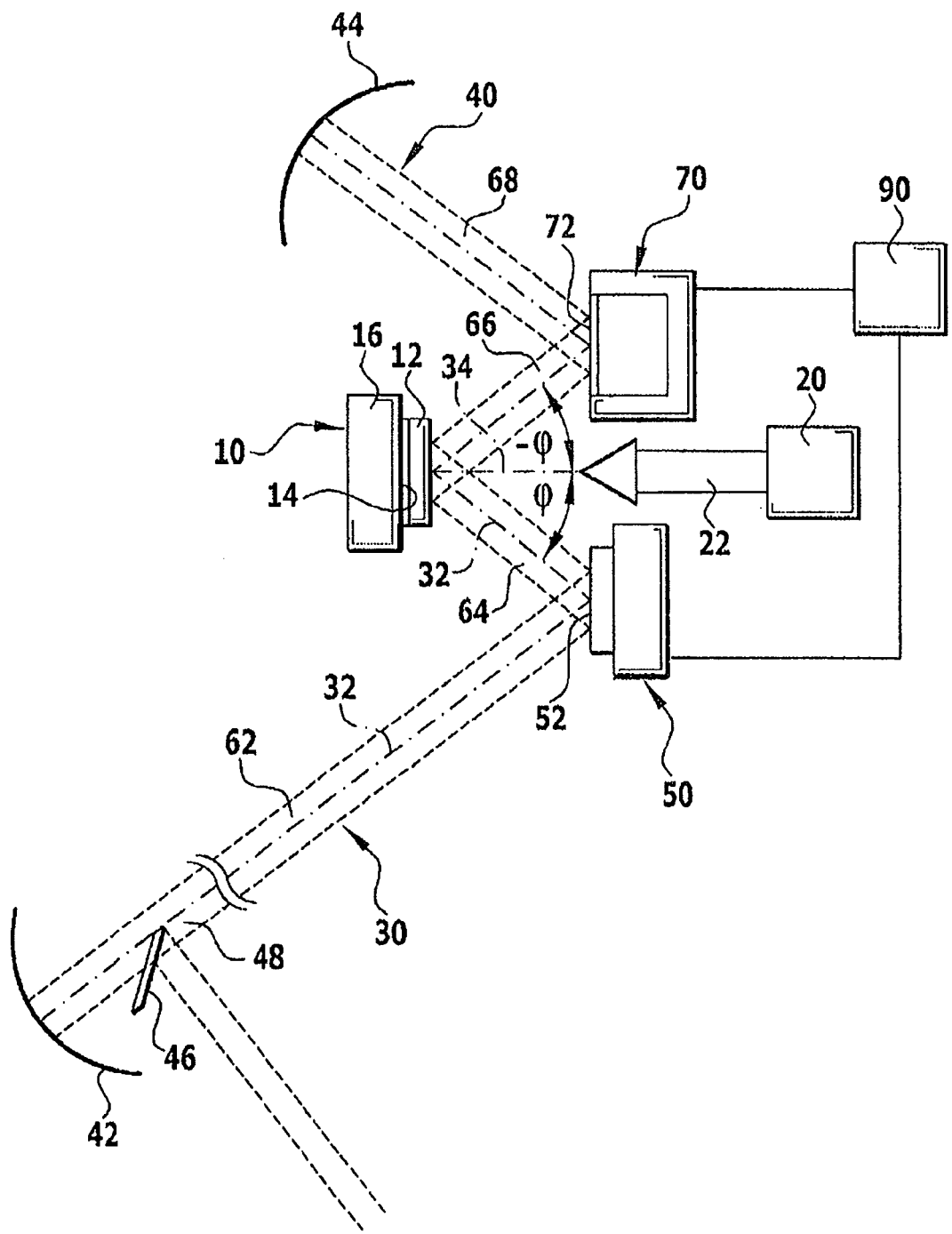
FIG. 1 is a schematic representation of a first exemplary embodiment of a solid-state laser according to the invention.

A first exemplary embodiment of a solid-state laser according to the invention shown in FIG. 1 comprises an amplification element, given the overall reference 10, which has a solid-state disc 12, which is in turn arranged on a reflector 14, e.g. a reflector layer 14, wherein the reflector layer 14 is in turn arranged on a cooling body 16, which is connected to the reflector layer 14 in a thermally conductive manner. The reflector layer 14 in turn allows a conduction of heat between the solid-state disc 12 and the cooling element, so that the solid-state disc 12 is cooled over its surface.

Such an amplification unit 10 is described in detail, for example, in European patent applications 0 632 551 A, 0 869 591 A, 0 869 592 A, 1 453 157 A.

The solid-state disc 12 constitutes a laser active medium, preferably a material that is also described, for example, in European patent applications 0 632 551 A, 0 869 591 A, 0 869 592 A, 1 453 157 A.

The laser active medium in the solid-state disc 12 is preferably stimulated by pumped light exiting from a pumped light source 20 that strikes the solid-state disc 12 as pumped light radiation field 22, i.e. from a side opposite the reflector layer 14, and penetrates into the solid-state disc 12 and thus optically excites the laser active medium, wherein the reflector layer 14 preferably also simultaneously causes a reflection of the pumped light radiation field 22, so that a multipass of the pumped light radiation field 22 through the solid-state disc and therefore an improved optical excitation thereof occurs, wherein the multipass of the pumped light radiation field 22 is not restricted to a double pass, but can have a higher number of passes, wherein a suitable guidance of the pumped light radiation field 22 is necessary for this, which is also described in European patent applications 0 632 551 A, 0 869 591 A, 0 869 592 A, 1 453 157 A.

A resonator radiation field 30 strikes such an amplification unit 10 that is preferably configured rotationally symmetrically to an optical axis 32, so that the optical axis 32 meets the solid-state disc 12 at an acute angle $\phi$ relative to a normal 34 on said solid-state disc, penetrates into the solid-state disc 12 and is reflected by means of the reflector layer 14, and the resonator radiation field 30 exits again from the solid-state disc 12 with a path of the optical axis 32 at an angle $-\phi$ to the normal 34.

In this case, the resonator radiation field 30 is defined by a resonator with resonator mirrors 42 and 44, wherein the resonator 40 is configured as an unstable resonator and the resonator mirrors 42 therefore constitute concave mirrors.

The unstable resonator 40 is preferably configured as a confocal unstable resonator 40.

Figure 4:
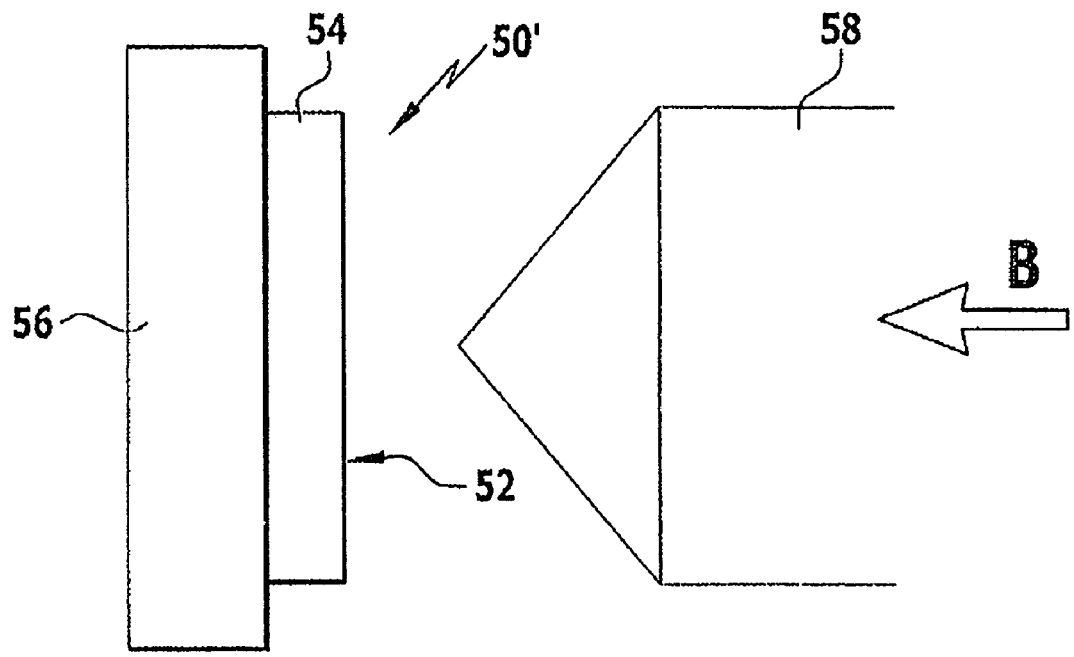
FIG. 4 is a sectional view similar to FIG. 2 through a second exemplary embodiment of a first adaptive mirror unit.
Figure 5:
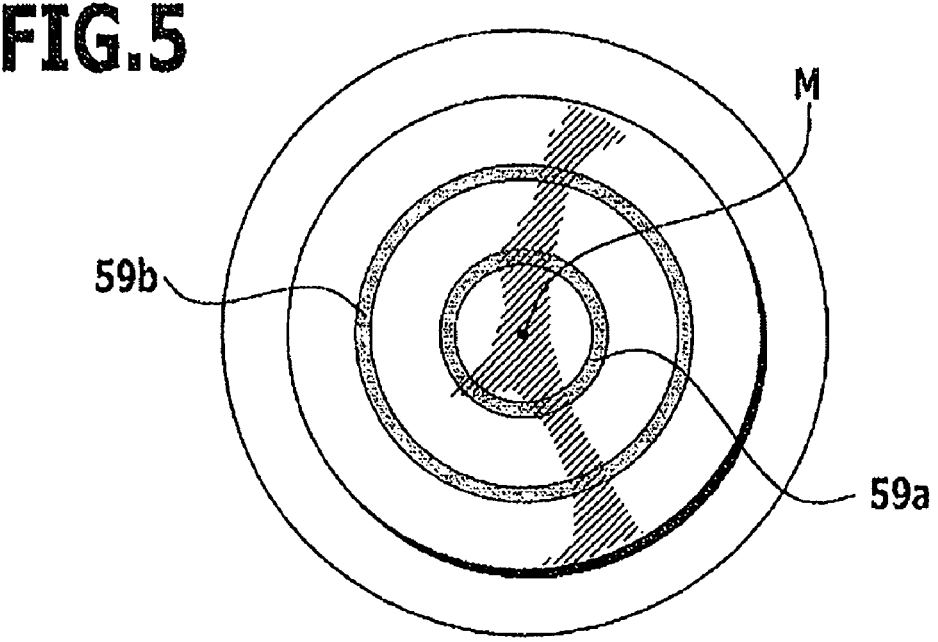
FIG. 5 is a plan view in the direction of arrow B in FIG. 4.

In the case of this confocal resonator 40 either one of the resonator mirrors 42 and 44 is configured as a sub-mirror that does not reflect the resonator radiation field 30 in an outer sub-region 48 representing a ring segment, but is transparent for this, as described in European patent application EP 1 566 866 in association with FIGS. 1 and 2, for example, or a so-called scraper mirror 46 is provided, which, as likewise described in European patent application EP 1 566 866 in association with FIGS. 3 and 4, decouples the ring segment from the unstable resonator 40 as outer sub-region 48 in relation to the optical axis 32.

As described in European patent applications 0 632 551 A, 0 869 591 A, 0 869 592 A, 1 453 157 A, the disc-shaped solid body 12 preferably produces only a small thermal lens, which at low power levels leads to a slight distortion of the resonator radiation field 30, but is considerable at high optical power levels.

To compensate such distortions, directly following the amplifier unit 10 there is provided a first adaptive mirror unit 50 that bears a highly reflective coating 52, which reflects a branch 62 of the resonator radiation field 30 leading to the resonator mirror 42 and in reflection couples with a branch 64 of the resonator radiation field that is incident into the solid-state disc 12 at the angle $\phi$ to the normal 34 and is reflected on the reflector layer 14 generating an emergent branch 66 coupled thereto, which strikes a second adaptive mirror unit 70 with a highly reflective coating 72, wherein the highly reflective coating 72 couples the branch 66 of the resonator radiation field 30 with a branch 68 of the resonator radiation field 20 that strikes the resonator mirror 44, for example.

Therefore, with the two adaptive mirror units 50 and 70 there is the possibility of compensating distortions of the resonator radiation field 30 that occur as a result of a thermal lens forming in the solid-state disc 12.

It is particularly advantageous for compensation of the distortions of the resonator radiation field 30 if the length of the branches 64 and 66 between the adaptive mirror units 50, 70 is as small as possible in relation to the branch 62 between the resonator mirror 42, close to which decoupling of the region 48 of the resonator radiation field occurs, and the closest adaptive mirror unit 50 or the amplification unit 10.

The branches 64, 66 of the resonator radiation field 30 are preferably shorter than branch 62 by a factor of more than three, better a factor of more than five and even better a factor of more than ten.

In addition, the amplification unit 10 and the adaptive mirror units 50, 70 are expediently arranged close to the resonator mirror 44, at which no decoupling occurs, so that the branch 68 between this resonator mirror 44 and the closest adaptive mirror unit 70 or the amplifier unit is significantly shorter than branch 62 of the resonator radiation field.

For example, the first adaptive mirror unit 50 comprises a plate that bears the highly reflective coating 52 and is composed of a thermally expanding material, e.g. a glass plate 54, which is arranged on a cooled support 56, wherein the glass plate 54 can be heated by heating elements 58a and 58b that are annular around a centre point M, wherein ring-shaped heated regions 59a and 59b in the plate 54 occur as a result of this, which in the state of thermal equilibrium cause a forward curvature of the plate 54 in these areas 59a and 59b because of the thermal expansion of the material, so that the highly reflective coating 52 in these regions 59a and 59b deviates from a plane form and in the regions 59a and 59b that are annular around the centre point M, for example, is raised in relation to the remaining surface. With these forwardly curved reflective regions 59a and 59b there is the possibility of compensating non-spherical distortions of the resonator radiation field 30.

Alternatively to the first adaptive mirror unit 50, a further exemplary embodiment of a first adaptive mirror unit 50' also provides a plate 54 with a highly reflective coating 52 that is arranged on the cooled support 56. However, a locally varying heating of the plate 54 in the regions 59a and 59b occurs to make this raised as a result of a radiation field 58, which has such a wavelength, e.g. in the infrared, that this can pass through the highly reflective coating 52 for the resonator radiation field 30 and is absorbed by the plate 54 in its interior, wherein the radiation field 58 has local variations in intensity, so that a locally different heating of the plate 54 also occurs, for example, in the regions 59a and 59b, i.e. preferably in annular shape, so that the highly reflective coating in the regions 59a and 59b behaves such that it deviates from a plane surface in the same way and therefore likewise serves to compensate non-spherical distortions of the resonator radiation field 30 triggered by the solid-state disc 12.

Figure 6:
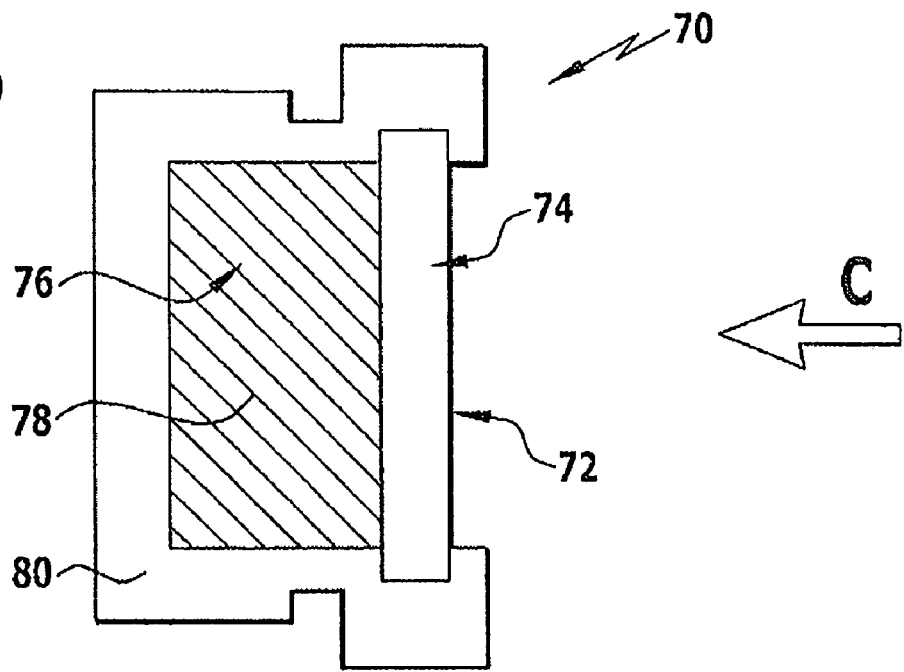
FIG. 6 is a sectional view similar to FIG. 2 through a second adaptive mirror unit.
Figure 7:
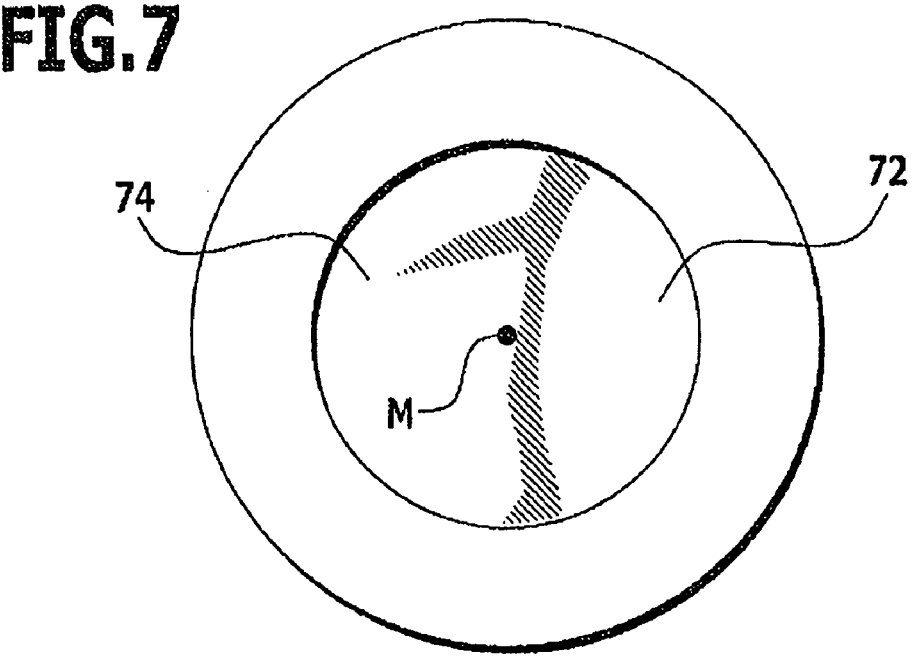
FIG. 7 is a plan view in the direction of arrow C in FIG. 6.

As shown in FIGS. 6 and 7, the second adaptive mirror unit 70 is likewise provided with a highly reflective coating 72, which is arranged on a plate 74, e.g. also a glass plate, wherein the plate 74 encloses a space 76, in which a fluid 78 is present. For example, the space 76 is delimited by a housing 80, in which the plate 74 is held and which extends on one side of the plate 74. As a result of a pressure change of the fluid 78 there is the possibility of curving the plate 74 concavely or convexly, so that the highly reflective coating 72 thus extends in an either slightly-convex or slightly concave surface, preferably also rotationally symmetrically to a centre point M, and thus provides the possibility of correcting spherical distortions of the resonator radiation field 30.

Moreover, such a second adaptive mirror unit 70 has the advantage that corrections are possible on a larger scale than with the first adaptive mirror units 50 or 50', although only insofar as these corrections lead to spherical distortions of the resonator radiation field 30.

Therefore, in the first exemplary embodiment of the solid body of the invention according to FIG. 1 there is the possibility of compensating non-spherical distortions of the resonator radiation field 30 with the first adaptive mirror unit 50, on the one hand, and of compensating spherical distortions of the resonator radiation field 30 with the second adaptive mirror unit 70, on the other.

Both the first adaptive mirror unit 50 and the second adaptive mirror unit 70 can be actuated by a control means given the overall reference 90, wherein the control means 90 enables control of the degree of compensation of the distortions of the resonator radiation field 30, which are dependent on the power of the resonator radiation field 30, so that in adaptation to the power of the resonator radiation field 30 the distortions triggered by the thermal lens effect in the solid-state disc 12 can be respectively corrected at least substantially, preferably completely, and therefore it is altogether possible to use the amplifier unit 10 with the solid-state disc 12, which develops a thermal lens effect, in the unstable resonator 40 and make use of the advantages of the unstable resonator 40, which consist of providing this with an extremely compact structure and, in particular in the case of high power levels, enabling an advantageous decoupling by means of the output mirror 46 or a partial resonator mirror 42, which only decouples a part-segment 48 of the resonator radiation field 30, but nevertheless is either completely transparent for this or completely reflects this, so that the problems that occur with partially transparent mirrors in the case of stable resonators can be avoided.

Figure 8:
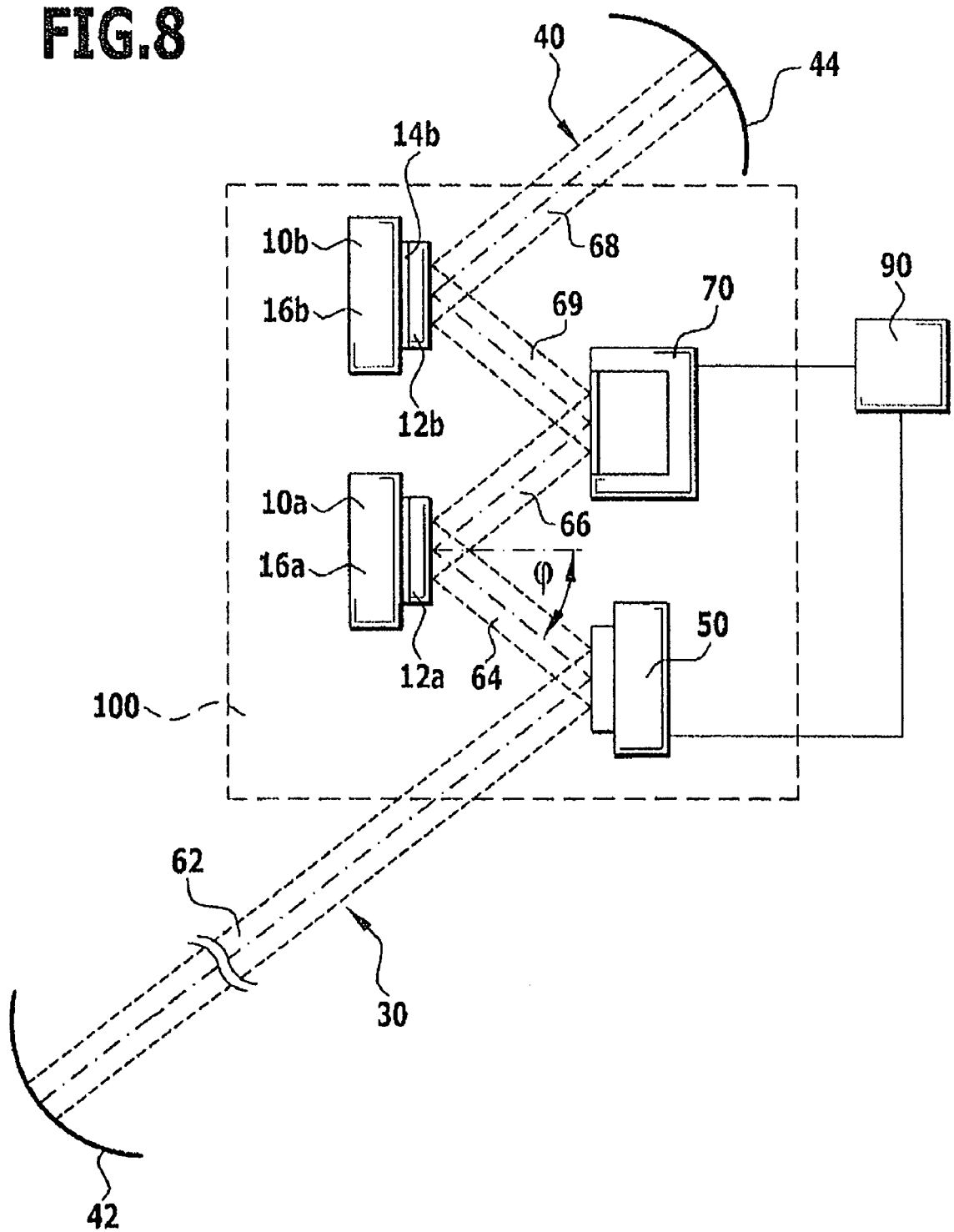
FIG. 8 is a schematic representation of a second exemplary embodiment of a solid-state laser according to the invention.

In a second exemplary embodiment of a solid-state laser according to the invention illustrated in FIG. 8, two amplification units 10a and 10b provided with a first adaptive mirror unit 50 and a second adaptive mirror unit 70, are provided in the resonator radiation field 30 of the unstable resonator 44, wherein the first adaptive mirror unit 50, for example, is arranged so that, in the same manner as in the first exemplary embodiment, it couples branch 62 of the resonator radiation field 30 with branch 64, which is then incident on the solid-state disc 12a, whereas the second adaptive mirror unit 70 couples branch 66 with branch 69 of the resonator radiation field 30, wherein branch 69 is then incident on the solid-state disc 12b, the reflector layer 14b of which couples branch 69 with branch 68 of the resonator radiation field 30, which then itself strikes the resonator mirror 44, for example.

In this exemplary embodiment the control means 90 controls the first adaptive mirror unit 50 as well as the second adaptive mirror unit 70 in such a manner that these two jointly substantially compensate the distortions of the resonator radiation field 30, which are generated by the thermal lens effects of the solid-state discs 12a and 12b, so that the thermal lens effects of two solid-state discs 12a and 12b can be compensated overall by two adaptive mirror units, namely the first adaptive mirror unit 50 and the second adaptive mirror unit 70.

Therefore, even with the provision of only two adaptive mirror units 50 and 70 it is possible to use two amplification units 10a and 10b with solid-state discs 12a and 12b in the unstable resonator 40.

The adaptive mirror units 50 and 70 as well as the amplification units 10a and 10b are preferably combined to form a compensated amplification module 100, which acts in a distortion-free manner on the resonator radiation field 30 because of the compensation of the thermal lens effects.

Figure 9:
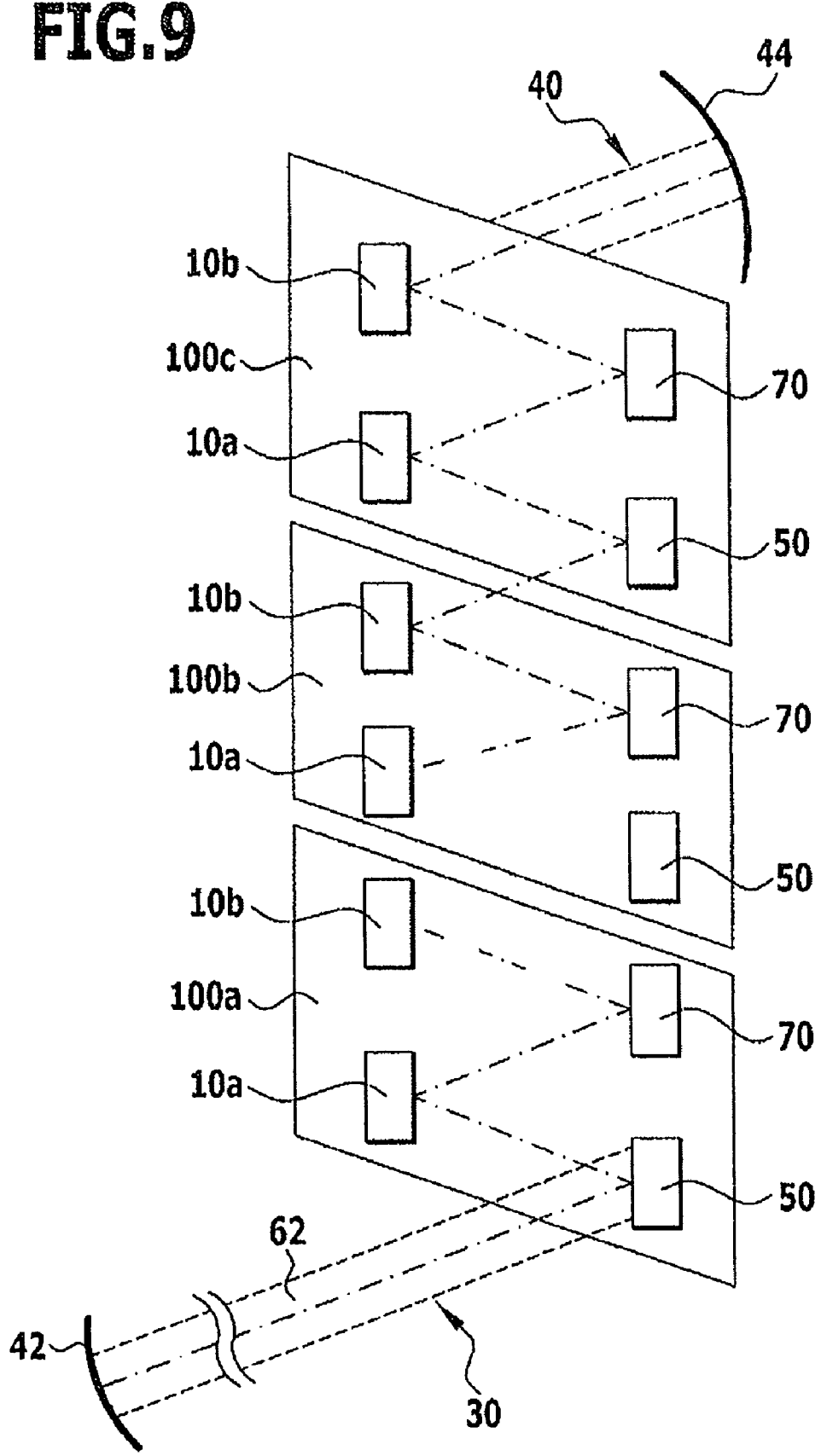
FIG. 9 is a schematic representation of a third exemplary embodiment of a solid-state laser according to the invention.

In a third exemplary embodiment shown in FIG. 9, a plurality of such amplification modules 100 described in the second exemplary embodiment according to FIG. 8 are provided in the resonator radiation field 30, namely amplification modules 100a, 100b and 100c, which overall act in a distortion-neutral manner on the resonator radiation field 30, so that the number of amplification modules 100 in the resonator radiation field 30 can be increased without the resonator radiation field 30 being subject to such large distortions that the resonator radiation field 30 can no longer be defined by the unstable resonator 40 with the resonator mirrors 42 and 44.

There is thus the possibility of increasing the power of the solid-state laser according to the third exemplary embodiment in a scalable manner according to the first or second exemplary embodiment without the thermal lens effects of the solid-state discs 12 having a negative effect on the resonator radiation field 30.

It is particularly favourable if the amplification modules 100 are arranged close to the resonator mirror 44, at which no decoupling of the resonator radiation field 30 occurs, so that branch 62 is significantly longer than branches 64, 66, 69 and 68, preferably by more than a factor of three, better more than a factor of five and even better more than a factor of ten.

The invention claimed is:

1. Solid-state laser, comprising:
a resonator that defines a resonator radiation field,
a plurality of compensated amplification modules provided in the resonator radiation field which act in a distortion neutral manner on the resonator radiation field to amplify the radiation field,
each of the plurality of compensated amplification modules comprising:
one or two solid-state discs with the resonator radiation field passing through the one or two solid-state discs,
a first adaptive mirror unit for the correction of nonspherical distortions, and
a second adaptive mirror unit for the correction of spherical distortions,
each of the plurality of compensated amplification modules act in a distortion neutral manner on the resonator radiation field due to compensation for a thermal lens effect.

2. Solid-state laser according to claim 1, wherein distortions of the resonator radiation field as a result of the thermal lens effect of a maximum of the two solid-state discs can be substantially compensated with the first adaptive minor unit.

3. Solid-state laser according to claim 1, wherein the first adaptive minor unit is a thermally adaptive mirror unit, the reflection behaviour of which is thermally adjustable.

4. Solid-state laser according to claim 1, wherein distortions as a result of thermal lens effect of a maximum of the two solid-state discs can be compensated with the second adaptive mirror unit.

5. Solid-state laser, comprising:
a resonator that defines a resonator radiation field,
at least one solid-state disc with the resonator radiation field passing through the at least one solid-state disc,
a first adaptive mirror unit, the resonator radiation field in reflection striking the at least one first adaptive mirror unit, and
a second adaptive minor unit provided in the resonator radiation field,
wherein:
a distortion of the resonator radiation field as a result of a thermal lens effect of the at least one solid-state disc can be substantially compensated for by the first adaptive mirror unit and the second adaptive mirror unit, and
the second adaptive mirror unit is configured as a hydrostatically adaptive minor.

6. Solid-state laser according to claim 1, wherein the one or two solid-state discs are arranged on a reflector and in reflection have the resonator radiation field passing through the one or two solid-state discs.

7. Solid-state laser according to claim 6, wherein the one or two solid-state discs are arranged with the reflector on a cooling body.

8. Solid-state laser according to claim 1, wherein each of the plurality of compensated amplification modules can be positioned in the resonator as a unit.

9. Solid-state laser according to claim 1, wherein two solid-state discs are combined with the first adaptive mirror unit and with the second adaptive mirror unit to form one of the plurality of compensated amplification modules.

10. Solid-state laser according to claim 8, wherein the resonator radiation field passes through the plurality of compensated amplification modules.

11. Solid-state laser according to claim 1, wherein the resonator is configured as an unstable resonator.

12. Solid-state laser according to claim 11, wherein the resonator is a confocal unstable resonator.

13. Solid-state laser according to claim 12, wherein the resonator is configured rotationally symmetrically to an optical axis of the resonator radiation field.

14. Solid-state laser according to claim 11, wherein a region of the resonator radiation field located radially outwardly in relation to an optical axis of the resonator radiation field can be decoupled from the unstable resonator.

15. Solid-state laser according to claim 14, wherein the region has a shape of a ring segment in relation to the optical axis.

16. Solid-state laser according to claim 15, wherein the region has a shape of a ring segment extending over approximately 180°.

17. Solid-state laser according to claim 16, wherein the decoupled radiation field is decoupled by means of a reflective decoupling minor.

* * * * *